United States Patent
Papa et al.

(10) Patent No.: US 12,553,384 B2
(45) Date of Patent: Feb. 17, 2026

(54) HIGH PRESSURE COOLING SYSTEMS FOR HYBRID AND CONVENTIONAL ENGINES

(71) Applicant: RTX Corporation, Farmington, CT (US)

(72) Inventors: Federico Papa, Port Saint Lucie, FL (US); Tannon Kraklio, Pittston, PA (US); William K. Ackermann, East Hartford, CT (US); Reza Rezvani, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/793,086

(22) Filed: Aug. 2, 2024

(65) Prior Publication Data
US 2026/0036088 A1 Feb. 5, 2026

(51) Int. Cl.
*F02C 7/18* (2006.01)
*B64D 13/06* (2006.01)
*B64D 33/08* (2006.01)

(52) U.S. Cl.
CPC .............. *F02C 7/185* (2013.01); *B64D 33/08* (2013.01); *F02C 7/18* (2013.01); *B64D 2013/0603* (2013.01)

(58) Field of Classification Search
CPC ...... F02C 7/12; F02C 7/14; F02C 7/16; F02C 7/18; F02C 7/185; F02C 6/06; F02C 6/08; B64D 2013/0603; B64D 2013/0614; B64D 2013/0644; F01D 25/12
See application file for complete search history.

(56) References Cited

U.S. PATENT DOCUMENTS

| | | | | |
|---|---|---|---|---|
| 4,091,613 A * | 5/1978 | Young | .................. | F02C 6/08 60/785 |
| 5,442,905 A * | 8/1995 | Claeys | .................. | B64D 41/00 60/785 |
| 5,701,755 A * | 12/1997 | Severson | .............. | B64D 13/00 62/88 |
| 9,003,811 B2 * | 4/2015 | Barnett | .................. | F02C 7/32 248/554 |
| 9,803,546 B2 * | 10/2017 | Willie | .................. | F04D 29/584 |
| 9,810,147 B2 * | 11/2017 | Tretow | .................. | B64D 13/06 |
| 10,773,807 B2 * | 9/2020 | Hall | .................. | F04D 25/06 |
| 10,801,410 B2 * | 10/2020 | Roberge | .................. | F01D 9/065 |
| 10,882,623 B2 * | 1/2021 | DeFrancesco | ......... | B64D 13/06 |
| 11,187,151 B2 * | 11/2021 | Husband | .................. | F02C 7/16 |
| 11,578,657 B2 * | 2/2023 | Muldoon | ........... | H05K 7/20145 |
| 11,585,291 B2 * | 2/2023 | Muldoon | .................. | F02K 1/36 |
| 11,641,144 B2 * | 5/2023 | Paziński | .................. | H02K 1/32 290/52 |
| 11,702,986 B2 * | 7/2023 | Roberge | .................. | F01D 9/065 477/30 |

(Continued)

*Primary Examiner* — Alain Chau
(74) *Attorney, Agent, or Firm* — Bachman & LaPointe, P.C.

(57) ABSTRACT

An environmental control system bleed cooling system including bleed air from the environmental control system bleed air system; a heat exchanger fluidly coupled between the environmental control system bleed air system and a gas turbine engine; and ambient cooling air fluidly coupled with the heat exchanger, wherein the ambient cooling air is configured to remove thermal energy from the bleed air flowing through the heat exchanger.

18 Claims, 2 Drawing Sheets

(56) References Cited

U.S. PATENT DOCUMENTS

| | | | |
|---|---|---|---|
| 11,719,113 B2* | 8/2023 | Muldoon | F01D 25/162 |
| | | | 60/782 |
| 11,791,691 B2* | 10/2023 | Seki | H02K 9/02 |
| | | | 290/52 |
| 12,044,149 B2* | 7/2024 | Muldoon | F02C 7/16 |
| 12,372,010 B1* | 7/2025 | Papa | F01D 25/12 |
| 2009/0188234 A1* | 7/2009 | Suciu | F02K 3/115 |
| | | | 60/39.83 |
| 2013/0133336 A1* | 5/2013 | Barnett | F01D 25/04 |
| | | | 248/671 |
| 2014/0248119 A1* | 9/2014 | Jen | F02C 7/14 |
| | | | 415/208.1 |
| 2015/0113999 A1* | 4/2015 | Tretow | F02C 7/18 |
| | | | 137/15.1 |
| 2015/0114481 A1* | 4/2015 | Willie | F02C 7/141 |
| | | | 137/15.1 |
| 2016/0347456 A1 | 12/2016 | Bruno et al. | |
| 2017/0305558 A1 | 10/2017 | Bruno | |
| 2017/0341760 A1* | 11/2017 | Hall | F01D 5/06 |
| 2018/0051702 A1* | 2/2018 | Kupiszewski | B64D 33/00 |
| 2018/0215472 A1* | 8/2018 | DeFrancesco | B64D 13/08 |
| 2018/0215474 A1 | 8/2018 | DeFrancesco et al. | |
| 2019/0271267 A1* | 9/2019 | Husband | F02C 7/185 |
| 2019/0316486 A1* | 10/2019 | Roberge | F02C 7/18 |
| 2020/0291810 A1* | 9/2020 | Spierling | F02K 1/04 |
| 2021/0239046 A1* | 8/2021 | Muldoon | F02C 7/16 |
| 2021/0324799 A1* | 10/2021 | Suzuki | B64D 33/08 |
| 2022/0045573 A1* | 2/2022 | Seki | F02C 7/18 |
| 2022/0082052 A1* | 3/2022 | Muldoon | F02K 1/04 |
| 2022/0128004 A1* | 4/2022 | Muldoon | H05K 7/20145 |
| 2022/0135236 A1* | 5/2022 | Abele | F02C 7/18 |
| | | | 454/76 |
| 2023/0250764 A1 | 8/2023 | Hallisey et al. | |
| 2025/0243781 A1* | 7/2025 | Papa | F01D 25/12 |

\* cited by examiner

HIGH PRESSURE COOLING SYSTEMS FOR HYBRID AND CONVENTIONAL ENGINES

BACKGROUND

The present disclosure is directed to the improved scoop-enhanced aircraft environmental control system bleed cooling system.

Future hybrid engine programs might require installation of electronics in the tail cone zone. The electronics can include generators, electrical motors, power feed cables, processor electronics, and the like. These electronics may have a low thermal capability and produce excess thermal energy that can develop temperatures which can damage or degrade the electronics. This new location for components with low thermal capability requires a ventilation system capable of maintaining temperatures within predetermined operational limits.

High pressure cooling systems are required to ventilate the tail cone for a hybrid engine with electrical components installed in this zone.

SUMMARY

In accordance with the present disclosure, there is provided an environmental control system bleed cooling system comprising bleed air from a bleed air system of the environmental control system; a heat exchanger fluidly coupled between the bleed air system and a gas turbine engine; and ambient cooling air fluidly coupled with the heat exchanger, wherein the ambient cooling air is configured to remove thermal energy from the bleed air flowing through the heat exchanger.

A further embodiment of any of the foregoing embodiments may additionally and/or alternatively include the heat exchanger is located within a pylon structure, the pylon structure in operative communication with an aircraft and the gas turbine engine.

A further embodiment of any of the foregoing embodiments may additionally and/or alternatively include the environmental control system further comprising a shutoff valve fluidly coupled between the environmental control system bleed air system and the heat exchanger.

A further embodiment of any of the foregoing embodiments may additionally and/or alternatively include the bleed air is fluidly coupled between the heat exchanger and at least one of a tail cone and components within the gas turbine engine.

A further embodiment of any of the foregoing embodiments may additionally and/or alternatively include the environmental control system further comprising electronics located within a tail cone of the gas turbine engine; wherein the bleed air is fluidly coupled with the electronics and configured to cool the electronics.

A further embodiment of any of the foregoing embodiments may additionally and/or alternatively include the environmental control system further comprising an air inlet fluidly coupled with the ambient cooling air upstream of the heat exchanger; and an air outlet fluidly coupled with the ambient cooling air downstream of the heat exchanger.

A further embodiment of any of the foregoing embodiments may additionally and/or alternatively include the environmental control system further comprising an air scoop in operative communication with the ambient cooling air upstream of the heat exchanger; and an ejector in operative communication with the ambient cooling air downstream of the heat exchanger.

In accordance with the present disclosure, there is provided a scoop-enhanced aircraft environmental control system comprising a pylon structure in operative communication between the aircraft and a gas turbine engine; a heat exchanger located within the pylon structure; an aircraft environmental control bleed air system bleed air fluidly coupled upstream of the heat exchanger; a gas turbine engine component fluidly coupled with bleed air from the environmental control bleed air system downstream of the heat exchanger; and ambient cooling air fluidly coupled with the heat exchanger, wherein the ambient cooling air is configured to remove thermal energy from the bleed air from the environmental control bleed air system flowing through the heat exchanger.

A further embodiment of any of the foregoing embodiments may additionally and/or alternatively include an aircraft environmental control bleed cooling system further comprising a shutoff valve fluidly coupled between the environmental control bleed air system and the heat exchanger.

A further embodiment of any of the foregoing embodiments may additionally and/or alternatively include the bleed air of the environmental control bleed air system is fluidly coupled between the heat exchanger and electronics located within a tail cone of the gas turbine engine; the bleed air of the environmental control bleed air system being configured to cool the electronics.

A further embodiment of any of the foregoing embodiments may additionally and/or alternatively include the scoop-enhanced aircraft environmental control bleed cooling system further comprising an air inlet fluidly coupled with the ambient cooling air upstream of the heat exchanger; and an air outlet fluidly coupled with the ambient cooling air downstream of the heat exchanger.

A further embodiment of any of the foregoing embodiments may additionally and/or alternatively include the scoop-enhanced aircraft environmental control bleed cooling system further comprising a fan in fluid communication with the air inlet; wherein the fan is configured to pump the ambient cooling air from the air inlet downstream to the heat exchanger pass through the heat exchanger and discharge downstream from the heat exchanger through the air outlet to an exterior.

A further embodiment of any of the foregoing embodiments may additionally and/or alternatively include the scoop-enhanced aircraft environmental control bleed cooling system further comprising an air scoop in operative communication with the ambient cooling air upstream of the heat exchanger; and an ejector in operative communication with the ambient cooling air downstream of the heat exchanger.

In accordance with the present disclosure, there is provided a process for a scoop-enhanced aircraft environmental control bleed cooling system comprising coupling a pylon structure in operative communication between the aircraft and a gas turbine engine; locating a heat exchanger within the pylon structure; fluidly coupling bleed air from an aircraft environmental control bleed air system upstream of the heat exchanger; fluidly coupling a gas turbine engine component with the bleed air of the environmental control bleed air system downstream of the heat exchanger; and fluidly coupling an ambient cooling air with the heat exchanger; and removing thermal energy from the bleed air of the environmental control bleed air system flowing through the heat exchanger with the ambient cooling air.

A further embodiment of any of the foregoing embodiments may additionally and/or alternatively include the process further comprising fluidly coupling a shutoff valve between the environmental control bleed air system and the heat exchanger.

A further embodiment of any of the foregoing embodiments may additionally and/or alternatively include the process further comprising fluidly coupling the bleed air of the environmental control bleed air system between the heat exchanger and electronics located within a tail cone of the gas turbine engine; and cooling the electronics with the bleed air of the environmental control bleed air system.

A further embodiment of any of the foregoing embodiments may additionally and/or alternatively include the process further comprising fluidly coupling an air inlet with the ambient cooling air upstream of the heat exchanger; and fluidly coupling an air outlet with the ambient cooling air downstream of the heat exchanger.

A further embodiment of any of the foregoing embodiments may additionally and/or alternatively include the process further comprising coupling a fan in fluid communication with the air inlet; and configuring the fan to pump the ambient cooling air from the air inlet downstream to the heat exchanger passing through the heat exchanger and discharging downstream from the heat exchanger through the air outlet to an exterior.

A further embodiment of any of the foregoing embodiments may additionally and/or alternatively include the process further comprising connecting an air scoop in operative communication with the ambient cooling air upstream of the heat exchanger; and connecting an ejector in operative communication with the ambient cooling air downstream of the heat exchanger.

A further embodiment of any of the foregoing embodiments may additionally and/or alternatively include the air scoop and the ejector are coupled to the pylon structure.

The disclosure considers employing an aircraft bleed system as a source of cooling air flow with a heat exchanger used to reduce the temperature enough to cool components in the tail cone. The system can be used with traditional engines by taking some amount of ventilation air from the engine bleed system. The high pressure cooling air can be also used to provide dedicated cooling air to engine components, some examples are valves, starter, electrical generators, and the like.

Other details of the scoop-enhanced aircraft environmental control bleed cooling system are set forth in the following detailed description and the accompanying drawings wherein like reference numerals depict like elements.

DETAILED DESCRIPTION

Figure 1:
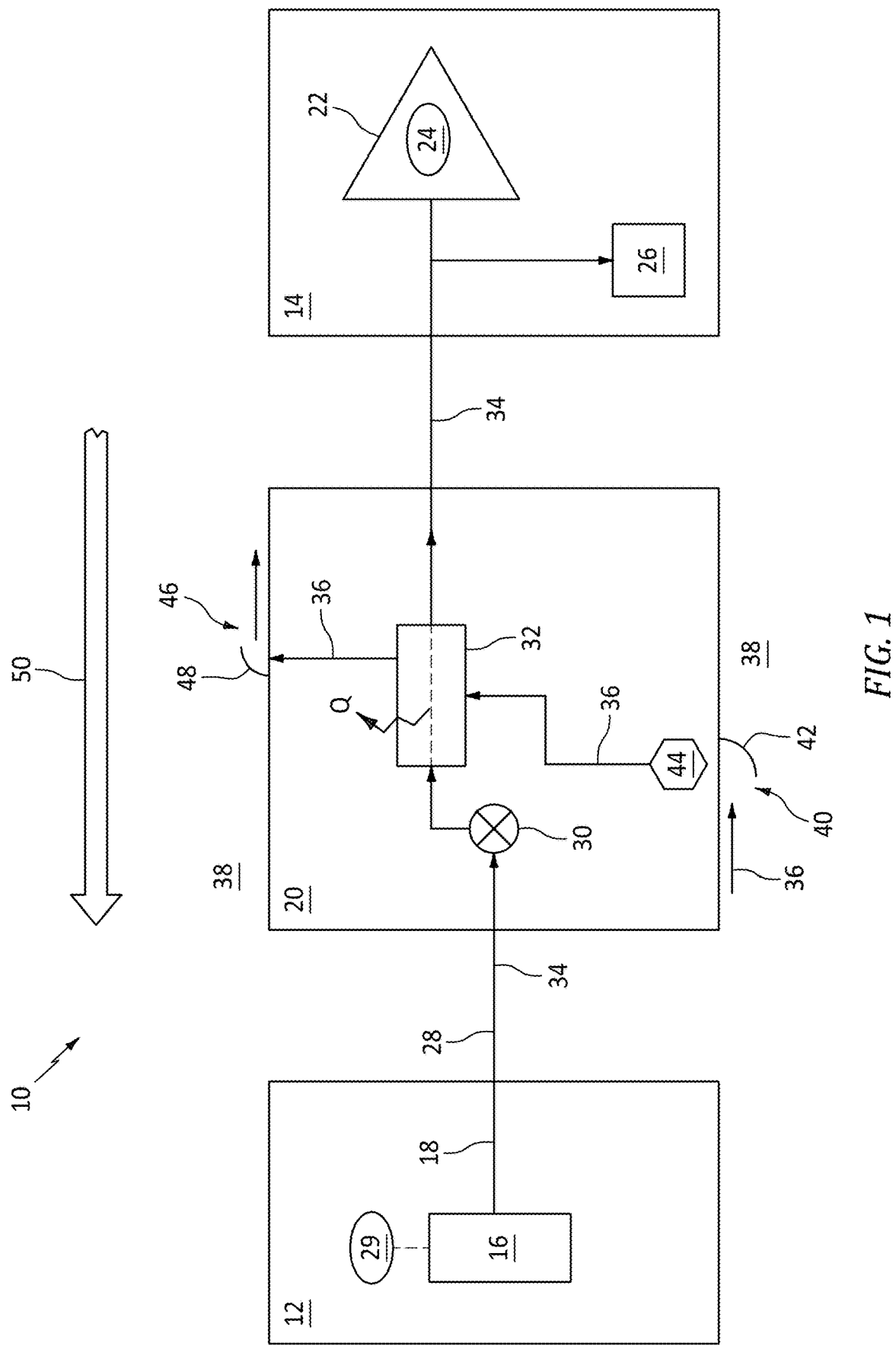
FIG. 1 is a schematic representation of an exemplary cooling system.
Figure 2:
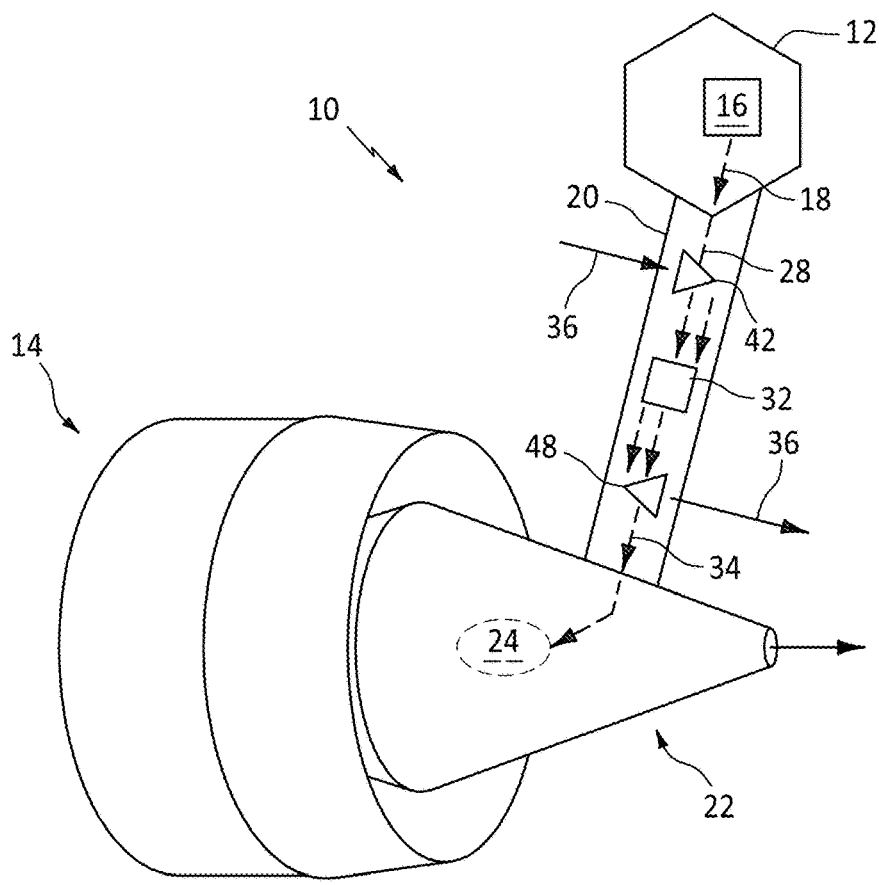
FIG. 2 is a schematic representation of an exemplary aircraft and cooling system.
Figure 3:
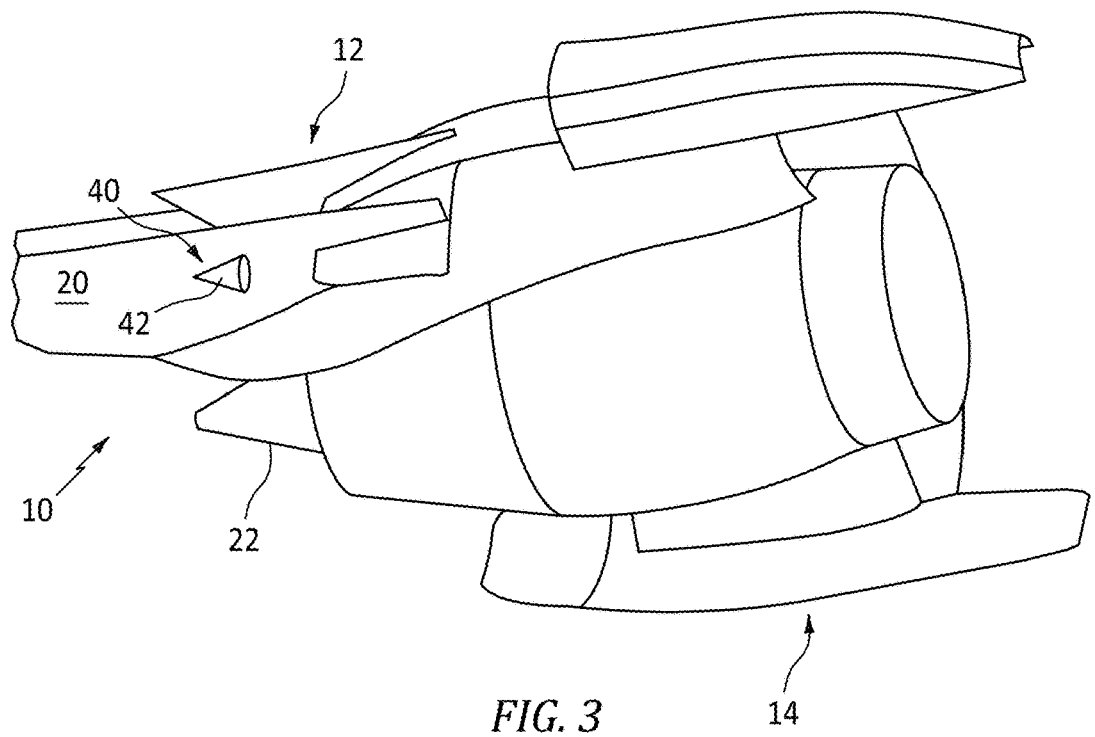
FIG. 3 is a schematic representation of an exemplary engine and cooling system.

Referring now to FIGS. 1, 2 and 3 an exemplary cooling system 10 is shown associated with an aircraft 12 and gas turbine engine 14. The aircraft 12 is shown with an environmental control system 16. In an exemplary embodiment, the aircraft 12 can be a flight test aircraft. The environmental control system 16 includes an environmental control bleed system 18. In an exemplary embodiment, a bleed system from the gas turbine engine 14 and/or the environmental control bleed system 16 can be employed. The aircraft 12 is shown coupled to the gas turbine engine 14 via a pylon structure 20 proximate a tail cone 22. In an exemplary embodiment, the aircraft 12 can have four gas turbine engines 14, with the cooling system 10 being associated with just one of the four gas turbine engines 14. In an exemplary embodiment, the engines 14 can be different engine models. For example, three engines can be similar taken from an A380 aircraft and one engine 14 can be a hybrid engine, utilized for testing.

The cooling system 10 is configured to cool electronic components 24 located within the tail cone 22 and/or components 26 that are in hard to plumb locations of the gas turbine engine 14. For example, a hard to plumb location can be an aft end fan outside diameter compartment. The electronic components 24 can include a generator, electrical motors, power feeder cables, processor electronics, and the like.

The cooling system 10 includes bleed air 28 taken from the environmental control bleed air system 18. The bleed air 28 can be at a pressure of about 30 pounds per square inch gauge and about 200 degrees Centigrade. The bleed air 28 has been passed through an engine precooler 29 prior to being available for the cooling system 10. The bleed air 28 is fed through an emergency shutoff valve 30. The emergency shutoff valve 30 can be actuated closed in the case of off-normal conditions that require preventing the loss of the bleed air 28 supply.

A heat exchanger 32 is fluidly coupled with the environmental control system bleed air system 18 and the gas turbine engine 14, particularly the tail cone 22 and/or components 26. The bleed air 28 can flow through cooling air lines 34 from the environmental control system bleed air system 18 to the heat exchanger 32 and pass to the gas turbine engine 14, tail cone 22 and/or components 26 to provide cooling for the electronic components 24 associated with the tail cone 22. The heat exchanger 32 can be located in the pylon structure 20.

The heat exchanger 32 can be configured as an air to air heat exchanger. The heat exchanger 32 can include an oversized cold side area to account for the relatively lower/reduced pressure differential of an ambient cooling air 36 flowing through the heat exchanger 32. In an exemplary embodiment, the pressure differential can be less than 0.5 psi. The relatively hot (approximately 200 degrees Centigrade) bleed air 28 can flow through the heat exchanger 32 and transfer thermal energy Q to a relatively cooler ambient cooling air 36 that flows through the heat exchanger 32.

The ambient cooling air 36 can be supplied from an exterior 38 of the pylon structure 20 via an air inlet 40 formed as an air scoop 42. The air scoop 42 can be configured as a forward-facing ram scoop. A ram-air intake can be any intake design which uses the dynamic air pressure created by vehicle motion, such as the aircraft 12, or ram pressure, to increase the static air pressure inside of an intake manifold of a device utilizing the air, thus allowing a greater mass flow through the device, such as the heat exchanger 32. The air scoop 42 can be in operative communication with the exterior 38 of the pylon structure 20.

A fan 44 can be in fluid communication with the air inlet 40 and can help to pump the ambient cooling air 36 from the air inlet 40 downstream to the heat exchanger 32, pass through the heat exchanger 32 and discharge downstream from the heat exchanger 32 through air outlet 46 being expelled out to the exterior 38. The ambient cooling air 36 can pass through the heat exchanger 32 and receive the thermal energy Q transferred from the warmer bleed air 28.

The ambient cooling air 36 can be discharged downstream from the heat exchanger 32 to an air outlet 46. The air outlet 46 can include an ejector 48 formed as a rearward-facing suction scoop. The ejector 48 can be a vacuum ejector, or simply ejector which is a type of vacuum pump, which produces vacuum by means of the Venturi effect. The air outlet 46 can be in operative communication with the pylon structure 20. The ambient cooling air 36 is discharged to the exterior 38. The arrow 50 indicates the relative direction the aircraft 12 is moving for illustration purposes. The forward-facing air scoop 42 and the air ejector 48 can provide added air pressure differential for the ambient cooling air 36 to flow through the heat exchanger 32 to cool the bleed air 28.

A technical advantage of the disclosed scoop-enhanced aircraft environmental control bleed cooling system includes enabling a ventilation system for Hybrid engines during all flight conditions using aircraft bleed system.

Another technical advantage of the disclosed scoop-enhanced aircraft environmental control bleed cooling system includes providing dedicated cooling air to other engine components.

Another technical advantage of the disclosed scoop-enhanced aircraft environmental control bleed cooling system includes a cooling system configured to cool electronic components located within the tail cone and/or components that are in hard to plumb locations of the gas turbine engine.

Another technical advantage of the disclosed scoop-enhanced aircraft environmental control bleed cooling system includes bleed air being fed through an emergency shutoff valve which is actuated closed in the case of off-normal conditions that require preventing the loss of the bleed air supply.

Another technical advantage of the disclosed scoop-enhanced aircraft environmental control bleed cooling system includes a heat exchanger which includes an oversized cold side area to account for the relatively lower/reduced pressure differential of the ambient cooling air flowing through the heat exchanger.

There has been provided a scoop-enhanced aircraft environmental control bleed cooling system. While the scoop-enhanced aircraft environmental control bleed cooling system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An environmental control system comprising:
   bleed air from a bleed air system of the environmental control system;
   a heat exchanger fluidly coupled between the bleed air system and a gas turbine engine;
   ambient cooling air fluidly coupled with the heat exchanger, wherein the ambient cooling air is configured to remove thermal energy from the bleed air flowing through the heat exchanger;
   wherein the heat exchanger is located within a pylon structure, the pylon structure in operative communication with an aircraft and the gas turbine engine; and
   wherein the bleed air is fluidly coupled between the heat exchanger and a tail cone of the gas turbine engine.

2. The environmental control system according to claim 1, further comprising:
   a shutoff valve fluidly coupled between the environmental control system bleed air system and the heat exchanger.

3. The environmental control system according to claim 1, further comprising:
   electronics located within the tail cone of the gas turbine engine; wherein the bleed air is fluidly coupled with the electronics and configured to cool the electronics.

4. The environmental control system according to claim 1, further comprising:
   an air inlet fluidly coupled with the ambient cooling air upstream of the heat exchanger; and
   an air outlet fluidly coupled with the ambient cooling air downstream of the heat exchanger.

5. The environmental control system according to claim 1, further comprising:
   an air scoop in operative communication with the ambient cooling air upstream of the heat exchanger; and
   an ejector in operative communication with the ambient cooling air downstream of the heat exchanger.

6. An aircraft environmental control bleed cooling system comprising:
   a pylon structure in operative communication between the aircraft and a gas turbine engine;
   a heat exchanger located within the pylon structure;
   an aircraft environmental control system bleed air system bleed air fluidly coupled upstream of the heat exchanger;
   a gas turbine engine component fluidly coupled with bleed air from the environmental control system bleed air system downstream of the heat exchanger;
   ambient cooling air fluidly coupled with the heat exchanger, wherein the ambient cooling air is configured to remove thermal energy from the bleed air from the environmental control system bleed air system flowing through the heat exchanger; and
   the bleed air of the environmental control system bleed air system is fluidly coupled between the heat exchanger and electronics located within a tail cone of the gas turbine engine.

7. The aircraft environmental control bleed cooling system according to claim 6, further comprising:
   a shutoff valve fluidly coupled between the environmental control system bleed air system and the heat exchanger.

8. The aircraft environmental control bleed cooling system according to claim 7, wherein the bleed air of the environmental control system bleed air system is configured to cool the electronics.

9. The aircraft environmental control bleed cooling system according to claim 6, further comprising:
   an air inlet fluidly coupled with the ambient cooling air upstream of the heat exchanger; and
   an air outlet fluidly coupled with the ambient cooling air downstream of the heat exchanger.

10. The aircraft environmental control bleed cooling system according to claim 9, further comprising:
    a fan in fluid communication with the air inlet; wherein the fan is configured to pump the ambient cooling air from the air inlet downstream to the heat exchanger, pass the ambient cooling air through the heat exchanger, and discharge the ambient cooling air downstream from the heat exchanger through the air outlet to an exterior.

11. The aircraft environmental control bleed cooling system according to claim 6, further comprising:
    an air scoop in operative communication with the ambient cooling air upstream of the heat exchanger; and
    an ejector in operative communication with the ambient cooling air downstream of the heat exchanger.

12. A process for aircraft environmental control bleed cooling system comprising:
coupling a pylon structure in operative communication between the aircraft and a gas turbine engine;
locating a heat exchanger within the pylon structure;
fluidly coupling bleed air from an aircraft environmental control bleed air system upstream of the heat exchanger;
fluidly coupling a gas turbine engine component with the bleed air of the environmental control bleed air system downstream of the heat exchanger; and
fluidly coupling an ambient cooling air with the heat exchanger;
removing thermal energy from the bleed air of the environmental control bleed air system flowing through the heat exchanger with the ambient cooling air; and
fluidly coupling the bleed air of the environmental control bleed air system between the heat exchanger and electronics located within a tail cone of the gas turbine engine.

13. The process of claim 12, further comprising:
fluidly coupling a shutoff valve between the environmental control bleed air system and the heat exchanger.

14. The process of claim 12, further comprising:
cooling the electronics with the bleed air of the environmental control bleed air system.

15. The process of claim 12, further comprising:
fluidly coupling an air inlet with the ambient cooling air upstream of the heat exchanger; and
fluidly coupling an air outlet with the ambient cooling air downstream of the heat exchanger.

16. The process of claim 12, further comprising:
coupling a fan in fluid communication with the air inlet; and
configuring the fan to pump the ambient cooling air from the air inlet downstream to the heat exchanger passing through the heat exchanger and discharging downstream from the heat exchanger through the air outlet to an exterior.

17. The process of claim 12, further comprising:
connecting an air scoop in operative communication with the ambient cooling air upstream of the heat exchanger; and
connecting an ejector in operative communication with the ambient cooling air downstream of the heat exchanger.

18. The process of claim 17, wherein the air scoop and the ejector are coupled to the pylon structure.

* * * * *